R. A. GOLDSMITH.
Thill-Coupling.
No. 218,014.  Patented July 29, 1879.
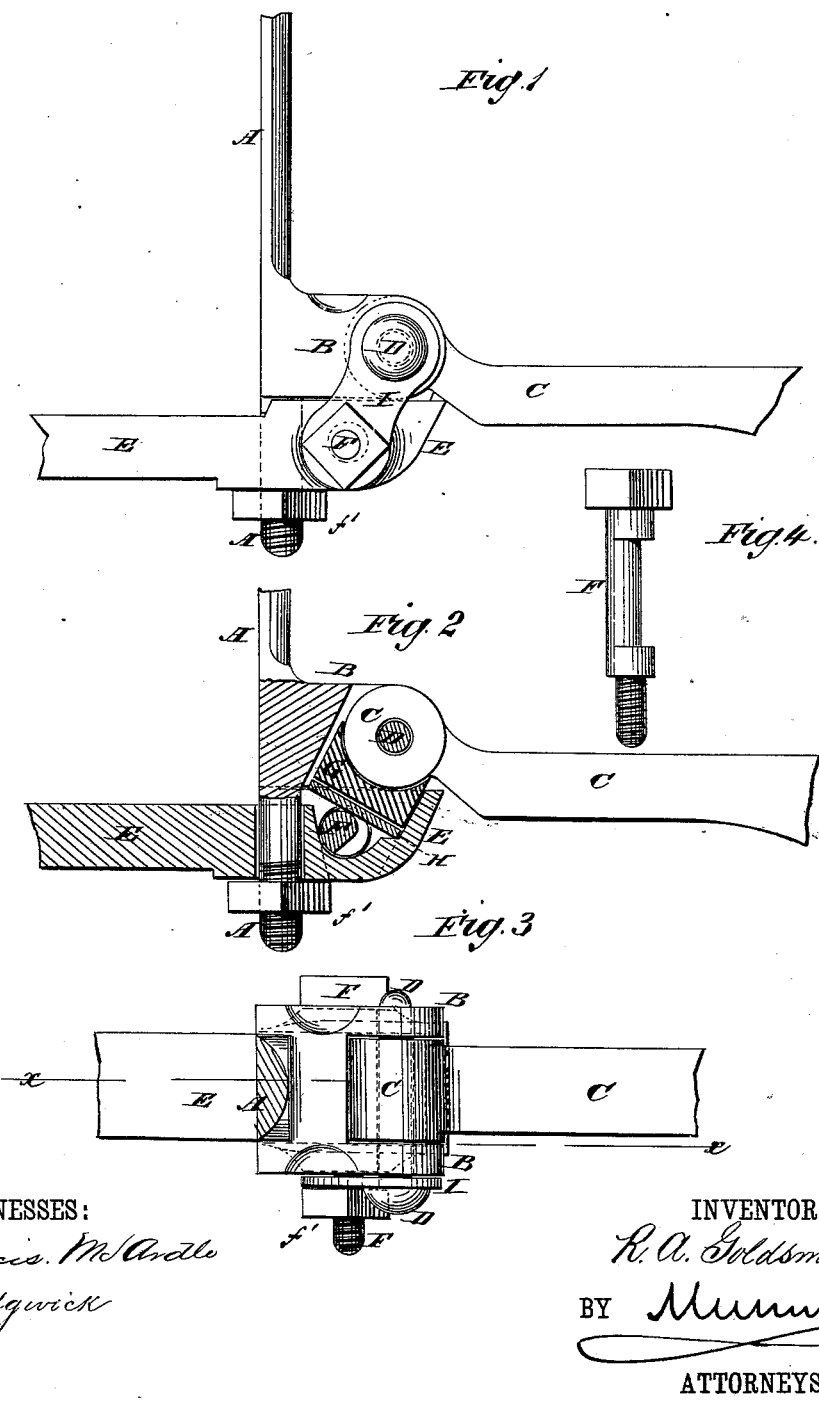

UNITED STATES PATENT OFFICE.

RIENZA A. GOLDSMITH, OF WASHINGTONVILLE, NEW YORK.

IMPROVEMENT IN THILL-COUPLINGS.

Specification forming part of Letters Patent No. 218,014, dated July 29, 1879; application filed December 26, 1878.

*To all whom it may concern:*

Be it known that I, RIENZA A. GOLDSMITH, of Washingtonville, in the county of Orange and State of New York, have invented a new and useful Improvement in Anti-Rattling Thill-Couplings, of which the following is a specification.

Figure 1 is a side view of my improved thill-coupling. Fig. 2 is a sectional view of the same, taken through the line $x\ x$, Fig. 3. Fig. 3 is a top view of the same. Fig. 4 is a detail view of the cam-bolt.

Similar letters of reference indicate corresponding parts.

The object of this invention is to improve the construction of the thill-coupling for which Letters Patent No. 201,107 were granted to me March 12, 1878, so as to make it less expensive in manufacture, while being equally convenient and effective in use.

The invention consists in forming upon the head of a coupling-bolt a plate with a hole through which the cam-bolt passes, so that the coupling-bolt may be secured by the nut that holds the cam-bolt.

A represents the bow of an axle-clip, upon the forward arm of which are formed lugs B to receive the eye of the thill-iron C and the bolt D, that pivots the said thill-iron to them. E is the yoke of the axle-clip, the forward end of which projects beneath the lugs B, and is recessed upon its upper side, beneath the space between the lugs B, to receive the cam or pressure-bolt F and the block G, of rubber or other suitable material for the packing. H is a metal plate interposed between the bolt F and the packing-block G to cause the pressure of the said bolt F to be applied to the entire bottom of the said packing-block G, and to prevent the said packing-block from bulging around the said bolt.

In this case the end of a plate, I, is attached to or formed upon the head of the said bolt D. The other end of the plate I has a hole formed through it to receive the forward end of the bolt F, so that the pivot-bolt D may be secured in place by the nut $f'$ of the said bolt F, as shown in Figs. 1 and 3.

I am aware that it is not new to press the plate that supports the rubber block of a thill-coupling by a set-screw; but

What I claim as new and of my invention is—

The plate I, attached at one end to the head of the bolt D, and at the other end provided with a hole, in combination with the bolt F, as and for the purpose specified.

RIENZA ADRIAN GOLDSMITH.

Witnesses:
   A. G. OWEN,
   P. M. OWEN.